United States Patent
Chuang

(10) Patent No.: US 11,354,963 B2
(45) Date of Patent: Jun. 7, 2022

(54) IDENTITY VERIFICATION DEVICE AND IDENTITY VERIFICATION METHOD

(71) Applicant: HON HAI PRECISION INDUSTRY CO., LTD., New Taipei (TW)

(72) Inventor: Chih-Yuan Chuang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 42 days.

(21) Appl. No.: 17/011,257

(22) Filed: Sep. 3, 2020

(65) Prior Publication Data

US 2021/0335075 A1    Oct. 28, 2021

(30) Foreign Application Priority Data

Apr. 28, 2020 (CN) .......................... 202010351407.4

(51) Int. Cl.
  *G07C 9/00*   (2020.01)
  *G07C 9/37*   (2020.01)
  *G06T 7/586*   (2017.01)
  *G06V 40/16*   (2022.01)

(52) U.S. Cl.
  CPC ............... *G07C 9/37* (2020.01); *G06T 7/586* (2017.01); *G06V 40/165* (2022.01); *G06V 40/166* (2022.01); *G06V 40/171* (2022.01); *G06V 40/172* (2022.01)

(58) Field of Classification Search
  CPC ...... G07C 9/37; G06T 7/586; G06K 9/00248; G06K 9/00255; G06K 9/00281; G06K 9/00288
  See application file for complete search history.

(56) References Cited

U.S. PATENT DOCUMENTS

| | | | |
|---|---|---|---|
| 2005/0089198 A1* | 4/2005 | Ono | G06V 10/141 348/E7.086 |
| 2010/0054620 A1* | 3/2010 | Kobayashi | G06T 3/0093 382/256 |
| 2010/0142764 A1* | 6/2010 | Ikegami | G06V 40/12 713/168 |
| 2011/0081089 A1* | 4/2011 | Mori | G06V 40/171 382/218 |
| 2015/0009352 A1* | 1/2015 | Shibagami | H04N 5/232122 348/218.1 |
| 2016/0379042 A1* | 12/2016 | Bourlai | G06V 40/171 382/118 |
| 2016/0379050 A1* | 12/2016 | Tian | G06V 40/40 382/118 |
| 2019/0384967 A1* | 12/2019 | Sun | G06V 40/174 |
| 2020/0105080 A1* | 4/2020 | Maeno | G06V 20/52 |
| 2021/0049252 A1* | 2/2021 | Ando | G01S 17/18 |
| 2021/0335075 A1* | 10/2021 | Chuang | G06V 10/75 |

* cited by examiner

*Primary Examiner* — MD K Talukder
(74) *Attorney, Agent, or Firm* — ScienBiziP, P.C.

(57) ABSTRACT

An identity verification method applied in an identity verification device is provided. The method includes controlling a first camera to capture an image of a user and performing a preliminary verification on the user based on the captured image. A first reference point and a second reference point are determined on a human face of the user in the captured image, when the user passes the preliminary verification. Once first reference information of the first reference point and second reference information of the second reference point are obtained, a re-verification on the user is performed based on the first reference information of the first reference point and the second reference information of the second reference point.

12 Claims, 6 Drawing Sheets

IDENTITY VERIFICATION DEVICE AND IDENTITY VERIFICATION METHOD

FIELD

The present disclosure relates to identity verification technologies, in particular to an identity verification device and an identity verification method.

BACKGROUND

The present face recognition technology generally first extracts facial features of a user, and then compares the facial features with prestored facial features to perform identity verification on the user.

However, illegal users may try to deceive an identity verification system by using photos, pictures, videos, or flat or three-dimensional puppets of a legal user, thereby causing the identity verification system to misjudge.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
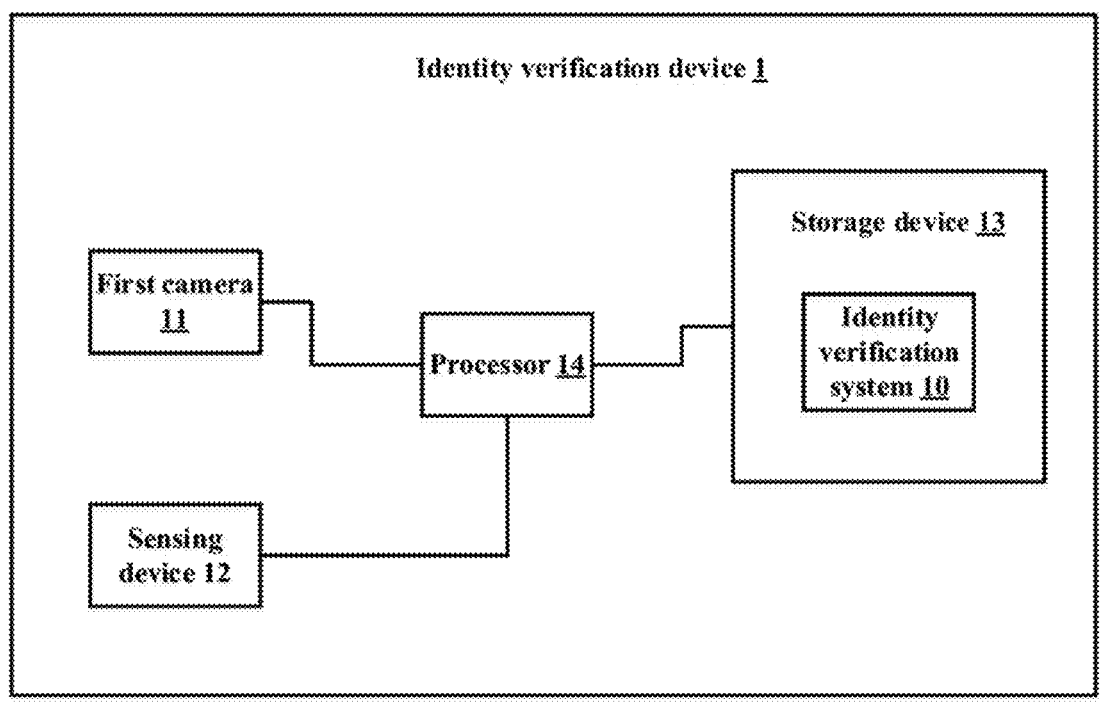
FIG. 1 is a block diagram of an identity verification device including an identity verification system according to a preferred embodiment of the present disclosure.
Figure 2:
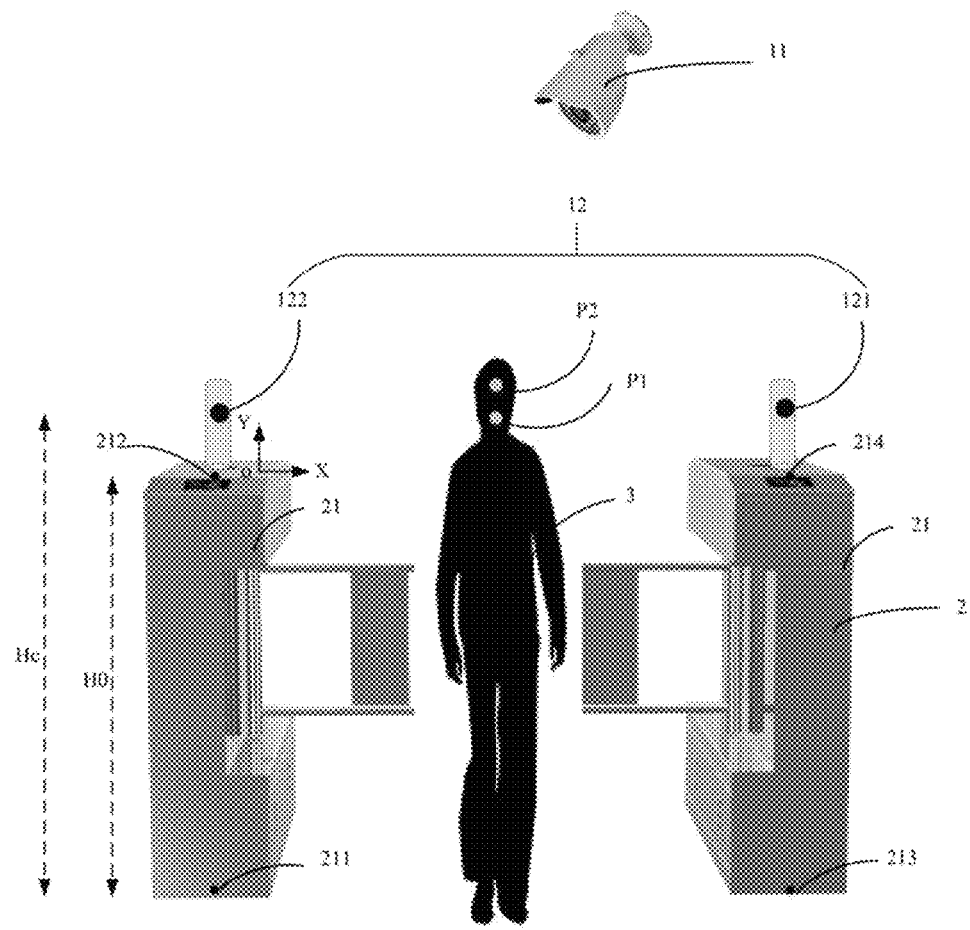
FIG. 2 and FIG. 3 respectively illustrate an application environment of the identity verification system of FIG. 1.
Figure 3:
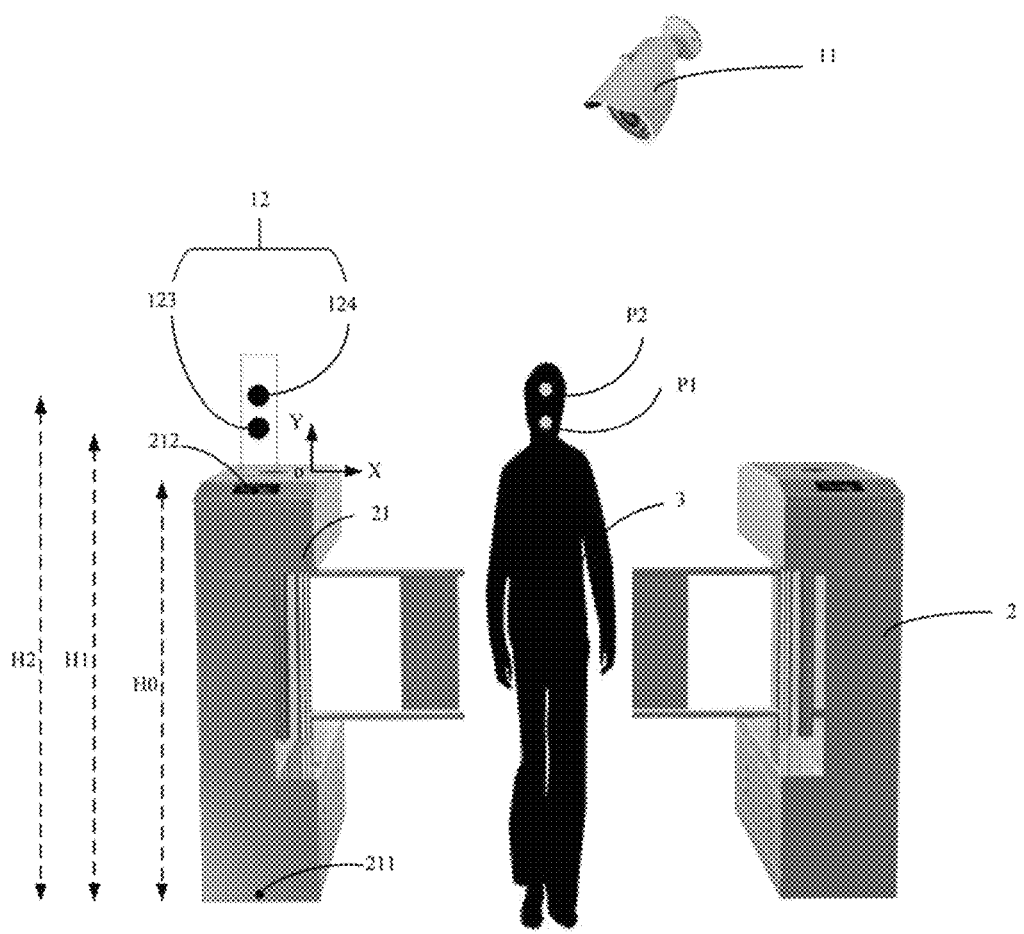

Referring to FIG. 1, FIG. 2, and FIG. 3, in one embodiment of the present disclosure, an identity verification system 10 runs in an identity verification device 1. The identity verification system 10 can perform identity verification on one or more users to be identified. For example, referring to FIG. 2 and FIG. 3, the identity verification system 10 can perform identity verification on each user who needs to pass through a gate 2. Details are introduced later.

In this embodiment, the identity verification device 1 includes, but is not limited to, a first camera 11, a sensing device 12, a storage device 13, and at least one processor 14. The above components are electronically connected to each other. The identity verification device 1 may be a server, a personal computer, and other devices.

In this embodiment, the first camera 11 and the sensing device 12 may be installed outside the identity verification device 1.

In this embodiment, the first camera 11 may be installed in a designated location. The designated location is a position where the first camera 11 can take an image of each user to be identified in a designated scene, and the image includes the user's face. The designated location can be determined according to an actual application scenario. For example, referring to FIG. 2 and FIG. 3, the designated location may refer to a position above the gate 2. The first camera 11 in the position above the gate 2 can take images of each user when each user is at the gate 2 (i.e., the user to be identified such as a user 3). Each user may want to pass through the gate 2.

The first camera 11 can take the images of each user to be identified (for example, the user 3) in the designated scene (for example, the gate 2). The processor 14 can control the first camera 11 to capture an image of the user to be identified in the designated scene. The processor 14 performs a preliminary verification on the user to be identified based on the captured image.

Specifically, the performing the preliminary verification on the user to be identified based on the captured image includes:

obtaining the captured image; and recognizing a human face of the user from the captured image;

obtaining a similarity degree between the recognized human face and a pre-stored face image of the user by matching the recognized human face with the pre-stored face image of the user and;

determining that the user passes the preliminary verification when the similarity degree is greater than a preset value (for example, 98%, or other values); and determining that the user does not pass the preliminary verification when the similarity degree is less than or equal to the preset value.

In one embodiment, when the user passes the preliminary verification, the processor 14 determines a first reference point and a second reference point on the recognized human face of the user.

In one embodiment, the determining the first reference point and the second reference point on the recognized human face of the user includes (a1)-(a2):

(a1) Marking a Predetermined Number of Feature Points on the Recognized Human Face of the User.

In one embodiment, the predetermined number equals 68. In one embodiment, the processor 14 can mark the 68 feature points on the recognized human face using an OpenCV (Open Source Computer Vision Library) and a Dlib function libraries.

Figure 4A:
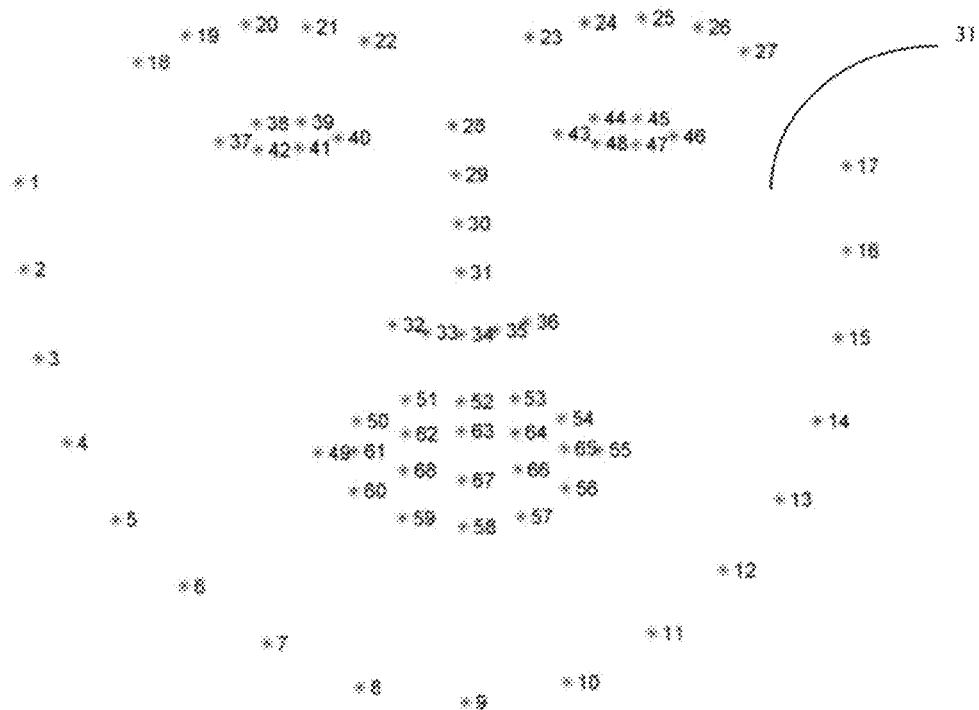
FIG. 4A illustrates 68 feature points of a human face.

For example, referring to FIG. 4A, the processor 14 marks 68 feature points on a recognized human face 31.

(a2) Determining Two of the Predetermined Number of Feature Points as the First Reference Point and the Second Reference Point.

In this embodiment, a straight line connecting the first reference point and the second reference point is not perpendicular to a horizontal axis.

Figure 4B:
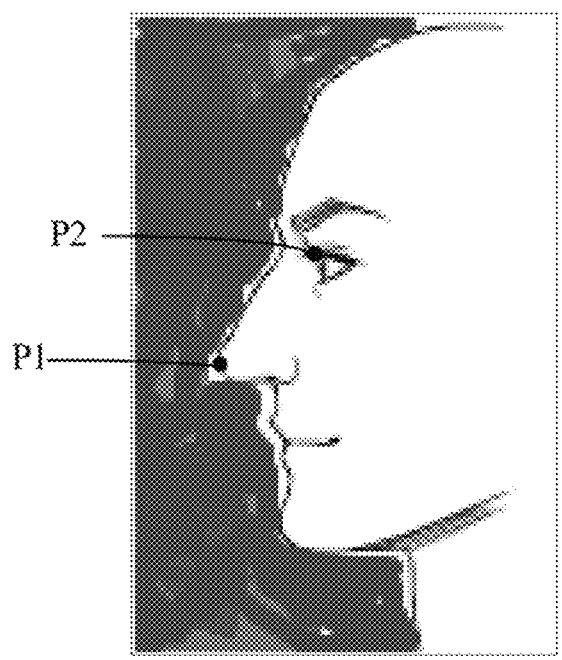
FIG. 4B illustrates two reference points of a profile image of a side face.

For example, referring to FIG. 4A and FIG. 4B, the first reference point is P1 that is corresponding to a location of the feature point 34, and the second reference point is P2 that is corresponding to a location of the feature point 45.

In one embodiment, after the first reference point and the second reference point are determined, the processor 14 obtains first reference information of the first reference point and second reference information of the second reference point using the sensing device 12.

In a first embodiment, the sensing device 12 includes a light emitting device 121 (shown in FIG. 2) and a second camera 122 (shown in FIG. 2). The sensing device 12 can capture a profile image/picture of the side face of the user to be recognized (for example, the user 3).

In one embodiment, referring to FIG. 2, the light emitting device 121 is installed on a gate post 21 on a right side of the gate 2. The second camera 122 is installed on the gate post 21 on a left side of the gate 2. That is, when the user 3 needs to pass through the gate 2, the second camera 122 and the light emitting device 121 are respectively located on the left and right sides of the human face of the user 3. In other words, the second camera 122 is located at a position corresponding to one side of the human face of the user 3, and the light emitting device 121 is located at a position corresponding to another side of the human face of the user 3.

In this embodiment, the light emitting device 121 can emit a light beam from one side of the human face of the user to be recognized to another side of the human face of the user to be recognized. The second camera 122 can capture the profile image of the side face of the user to be recognized while the light emitting device 121 emits the light beam.

In this embodiment, a type of the second camera 122 matches a type of the light beam emitted by the light emitting device 121. For example, when the light emitting device 121 emits invisible infrared light, the second camera 122 is an infrared camera. When the light emitting device 121 emits visible light, the second camera 122 is a visible light camera.

Preferably, the light emitting device 121 emits invisible infrared light. Correspondingly, the second camera 122 is an infrared camera, such that there is no uncomfortable feeling for the user to be identified (for example, the user 3).

In this embodiment, the light emitting device 121 may be installed on the gate post 21 of the gate 2 through a first lifting structure (not shown), and the processor 14 may adjust a distance of the light emitting device 121 relative to a lower end 213 of the gate post 21 by controlling the first lifting structure. In other words, the processor 14 can adjust a height of the light emitting device 121.

Similarly, the second camera 122 may also be installed on the gate post 21 of the gate 2 through a second lifting structure (not shown), and the processor 14 may adjust a distance of the second camera 122 relative to a lower end 211 of the gate post 21 by controlling the second lifting structure. In other words, the processor 14 can adjust a height of the second camera 122.

In one embodiment, when the first reference point and the second reference point are determined, the processor 14 controls the first lifting structure and the second lifting structure to control the sensing device 12 to move to a designated position. The designated position refers to a position where the first reference point and the second reference point can be captured.

Specifically, when the sensing device 12 is located at the designated position, the height of the second camera 122, i.e., the distance of the second camera 122 relative to the lower end 211 of the gate post 21 of the gate 2 is Hc, where $Hc=|Y0-(Y2+Y1)/2|/Y0*H0+H0$, where Y0 represents an ordinate of a top end 212 of the gate post 21, Y1 represents an ordinate of the first reference point P1, Y2 represents an ordinate of the second reference point P2, and H0 represents a distance between the lower end 211 and the top end 212 of the gate post 21.

In this embodiment, the processor 14 may first calculate the distance of the second camera 122 relative to the lower end 211 of the gate post 21 of the gate 2 (i.e., the height He of the second camera 122) using the above formula, and then control the second camera 122 to move to the height Hc.

It should be noted that the ordinate Y0 of the top end 212 of the gate post 21, the ordinate Y1 of the first reference point P1, and the ordinate Y2 of the second reference point P2 mentioned above may refer to position coordinates in an image that is obtained by capturing the designated scene (such as at the gate 2) using the first camera 11. For example, the position coordinates refer to coordinates in a coordinate system XOY shown in FIG. 2 and FIG. 3. The coordinate system XOY is established by setting the top end 212 of the gate post 21 as an origin, setting a horizontal direction as the X axis, and setting a vertical direction as the Y axis.

In one embodiment, when the sensing device 12 is located at the designated position, the distance of the light emitting device 121 relative to the lower end 213 of the gate post 21 is equal to the distance of the second camera 122 relative to the lower end 211 of the gate post 21.

The processor 14 also controls the sensing device 12 to capture the profile image of the side face of the user to be recognized when the sensing device 12 is located at the designated position. In this embodiment, the method of controlling the sensing device 12 to capture the profile image of the side face of the user to be recognized when the sensing device 12 is located at the designated position is to save energy consumption of the sensing device 12. It avoids that the sensing device 12 is always in a state of capturing the profile image of the side face of the user to be recognized.

In one embodiment, the processor 14 may acquire the first reference information of the first reference point and the second reference information of the second reference point from the profile image of the side face of the user to be recognized. In one embodiment, the processor 14 may also perform a second verification (i.e., re-verification) on the user to be identified based on a difference between the first reference information of the first reference point and the second reference information of the second reference point.

In one embodiment, the first reference information of the first reference point refers to a coordinate (hereinafter referred to as "first coordinate" for convenience of description) of the first reference point in the profile image of the side face. The second reference information of the second reference point refers to a coordinate (hereinafter referred to as "second coordinate" for convenience of description) of the second reference point in the profile image of the side face.

In one embodiment, the difference between the first reference information of the first reference point and the second reference information of the second reference point refers to a difference between an abscissa of the first coordinate and an abscissa of the second coordinate.

In an embodiment, when the difference between the abscissa of the first coordinate and the abscissa of the second coordinate is greater than a preset value (for example, 0.5 cm), the processor 14 determines that the user to-be-identified (for example, the user 3) passes the second verification (i.e., re-verification). When the difference between the abscissa of the first coordinate and the abscissa of the second coordinate is less than or equal to the preset value (for example, 0.5 cm), the processor 14 determines that the user to be identified (for example, the user 3) does not pass the second verification.

In one embodiment, the processor 14 establishes a coordinate system in which the first coordinate and the second coordinate are located includes: setting a lower left corner of the profile image of the side face as an origin, setting a lower side edge of the profile image of the side face as the X axis, and setting a left edge of the profile image of the side face as the Y axis.

It should be noted that the establishing of the coordinate system is for illustration only. Specifically, it can be established in combination with the embodiments of the present disclosure.

In this embodiment, when the user to be identified passes the preliminary verification and the second verification (i.e., re-verification), the processor 14 determines that the user to be identified is a real person (i.e., a person who does exist). The processor 14 allows the user to be identified passes through the gate 2. For example, when the user to be identified passes the preliminary verification and the re-verification, the processor 14 may control the gate 2 to open.

In a second embodiment, the sensing device 12 includes a first photoelectric sensor 123 (shown in FIG. 3) and a second photoelectric sensor 124 (shown in FIG. 3). In this embodiment, the sensing device 12 can sense the first reference point and the second reference point on the human face of the user to be recognized (for example, the user 3).

In one embodiment, the first photoelectric sensor 123 is used to sense the first reference point on the human face of the user to be recognized. The second photoelectric sensor 124 is used to sense the second reference point on the human face of the user to be recognized.

In this embodiment, referring to FIG. 3, a straight line connecting a location of the first photoelectric sensor 123 and a location of the second photoelectric sensor 124 is perpendicular to a horizontal plane.

In one embodiment, the first photoelectric sensor 123 may be installed on the gate post 21 of the gate 2 through a third lifting structure (not shown), and the second photoelectric sensor 124 may be installed on the gate post 21 of the gate 2 through a fourth lifting structure (not shown). The processor 14 can adjust a distance of the first photoelectric sensor 123 relative to the lower end 211 of the gate post 21 by controlling the third lifting structure, that is, the processor 14 can adjust a height of the first photoelectric sensor 123. The processor 14 can adjust a distance of the second photoelectric sensor 124 relative to the lower end 211 of the gate post 21 by controlling the fourth lifting structure, that is, the processor 14 can adjust a height of the second photoelectric sensor 124.

In one embodiment, when the first reference point and the second reference point are determined, the processor 14 may control the sensing device 12 to move to a designated position. When the sensing device 12 is located at the designated position, the first photoelectric sensor 123 and the second photoelectric sensor 124 can sense the first reference point and the second reference point, respectively.

Specifically, when the sensing device 12 is located at the designated position, the distance of the first photoelectric sensor 123 relative to the lower end 211 of the gate post 21 (i.e., the height of the first photoelectric sensor 123) is H1, where H1=|Y0−Y1|/Y0*H0+H0, where Y0 represents the ordinate of the top end 212 of the gate post 21, Y1 represents the ordinate of the first reference point P1, H0 represents the distance between the lower end 211 and the top end 212 of the gate post 21. Specifically, when the sensing device 12 is located at the designated position, the distance of the second photoelectric sensor 124 relative to the lower end 211 of the gate post 21 (i.e., the height of the second photoelectric sensor 124) is H2, where H2=|Y0−Y2|/Y0*H0+H0, where Y0 represents the ordinate of the top end 212 of the gate post 21, and Y2 represents the ordinate of the second reference point P2, H0 represents the distance between the lower end 211 and the top end 212 of the gate post 21.

In this embodiment, the processor 14 may first calculate the height H1 of the first photoelectric sensor 123 and the height H2 of the second photoelectric sensor 124 using the above formulas, and then the processor 14 can control the first photoelectric sensor 123 to move to the height H1, and the second photoelectric sensor 124 to move to the height H2.

It should be noted that the ordinate Y0 of the top end 212 of the gate post 21, the ordinate Y1 of the first reference point P1, and the ordinate Y2 of the second reference point P2 mentioned above may refer to the position coordinates in an image obtained by capturing a designated scene (such as the user to-be identified locates at the gate 2) using the first camera 11. For example, the position coordinates refer to the coordinates in the coordinate system XOY shown in FIG. 2 and FIG. 3. The coordinate system XOY is established by setting the top end 212 of the gate post 21 as the origin, setting the horizontal direction as the X axis, and setting the vertical direction as the Y axis.

In one embodiment, the processor 14 can control the first photoelectric sensor 123 to sense the first reference point and control the second photoelectric sensor 124 to sense the second reference point at the same time.

In this embodiment, the first reference information of the first reference point refers to a time (for convenience of description, hereinafter referred to as "first time") when the first reference point is sensed by the first photoelectric sensor 123. The second reference information of the second reference point refers to a time (hereinafter referred to as "second time" for convenience of description) when the second reference point is sensed by the second photoelectric sensor 124.

The processor 14 also records the first time and the second time.

In one embodiment, the processor 14 performs the re-verification on the user to be identified according to the first time and the second time.

Specifically, when a difference between the first time and the second time is greater than a preset value (for example, 0.1 second), the processor 14 determines that the user to be identified passes the re-verification. When the difference between the first time and the second time is less than or equal to the preset value, the processor 14 determines that the user to be identified does not pass the re-verification.

In this embodiment, when the user to be identified passes the preliminary verification and the re-verification, the processor 14 determines that the user to be identified is a real person (i.e., a person who does exist), the processor 14 allows the user to be identified to pass through the gate 2 when the user to be identified is determined to be a real person. For example, when the user to be identified passes the preliminary verification and the re-verification, the processor 14 may control the gate 2 to open.

In some embodiments, the storage device 13 can be used to store program codes of computer readable programs and various data, such as the identity verification system 10 installed in the identity verification device 1, and automatically access to the programs or data with high speed during running of the identity verification device 1. The storage device 13 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other storage medium readable by the identity verification device 1 that can be used to carry or store data.

In some embodiments, the at least one processor 14 may be composed of an integrated circuit, for example, may be composed of a single packaged integrated circuit, or multiple integrated circuits of same function or different functions. The at least one processor 14 can include one or more central processing units (CPU), a microprocessor, a digital processing chip, a graphics processor, and various control chips. The at least one processor 14 is a control unit of the identity verification device 1, which connects various components of the identity verification device 1 using various interfaces and lines. By running or executing a computer program or modules stored in the storage device 13, and by invoking the data stored in the storage device 13, the at least one processor 14 can perform various functions of the identity verification device 1 and process data of the identity verification device 1. For example, the function of performing identity verification on one or more users to be identified (details will be described in the following).

In this embodiment, the identity verification system 10 may be divided into one or more modules, the one or more modules are stored in the storage device 13 and executed by one or more processors (such as the processors 14) to realize the functions provided by the present disclosure.

Figure 5:
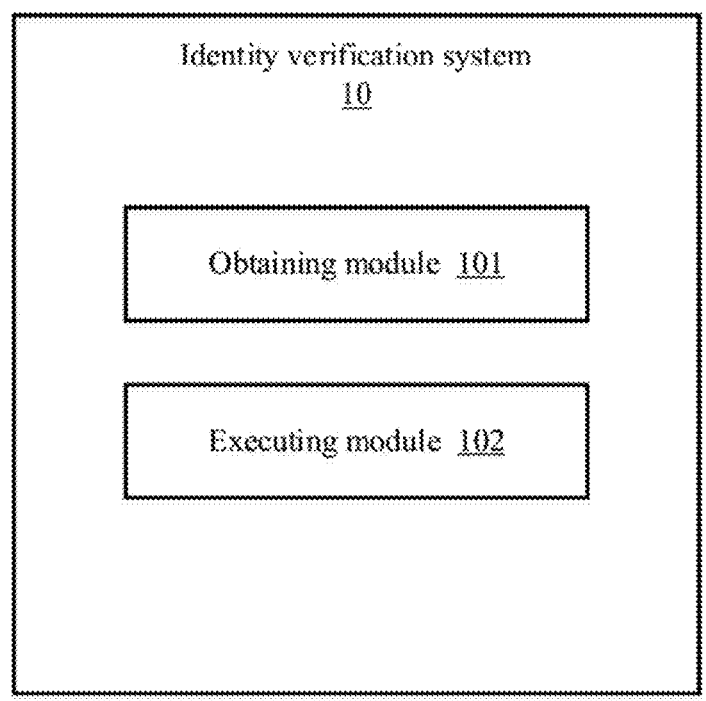
FIG. 5 is a block diagram of the identity verification system according to a preferred embodiment of the present disclosure.

Referring to FIG. 5, in this embodiment, the identity verification system 10 may include an obtaining module 101 and an executing module 102. The module referred to in the present disclosure is a program segment capable of performing a function. The detailed function of each module will be described in detail later.

Figure 6:
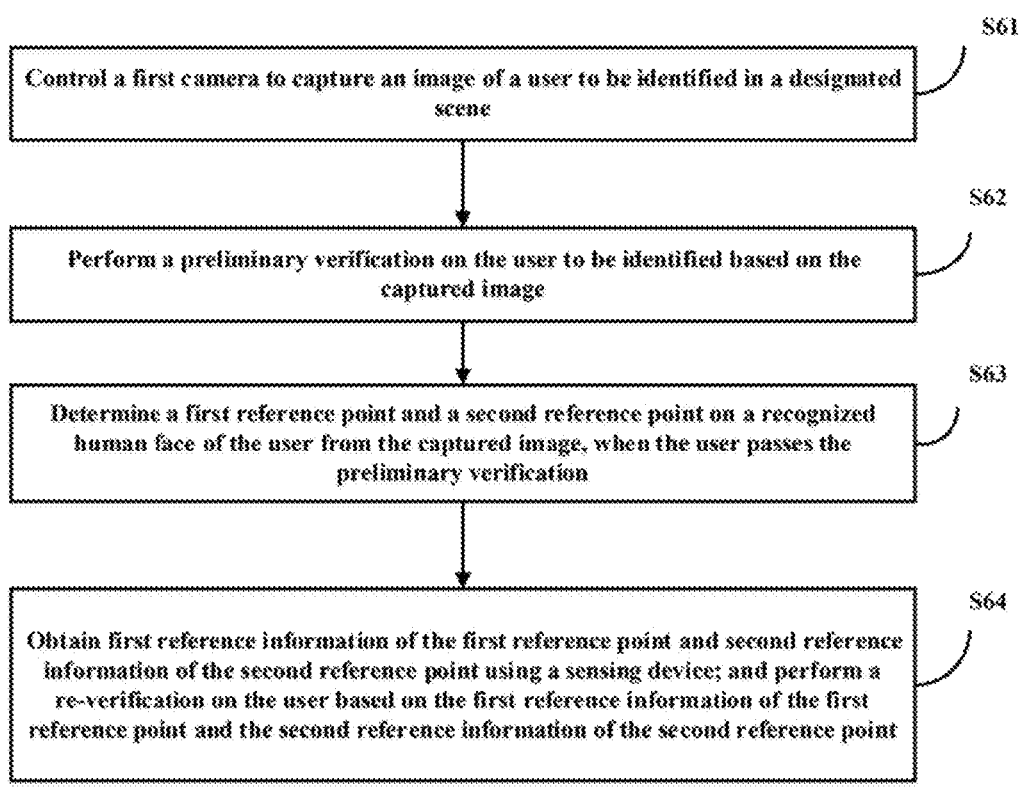
FIG. 6 is a flowchart of an identity verification method of a preferred embodiment of the present disclosure.

As shown in FIG. 6, it is a flowchart of a preferred embodiment of an identity verification method of the present disclosure. According to different requirements, the execution order between the blocs of the present disclosure may be changed, and some blocks may be omitted.

At block S61, the obtaining module 101 controls the first camera 11 to capture an image of a user to be identified in a designated scene.

For example, referring to FIG. 2 and FIG. 3, the obtaining module 101 may control the first camera 11 to capture of the image of the user to be identified (for example, the user 3) in the designated scene such as at the gate 2.

At block S62, the executing module 102 performs a preliminary verification on the user to be identified based on the captured image.

Specifically, the performing the preliminary verification on the user to be identified based on the captured image includes:

obtaining the captured image; and recognizing a human face of the user from the captured image;

obtaining a similarity degree between the recognized human face and a pre-stored face image of the user by matching the recognized human face with the pre-stored face image of the user and;

determining that the user passes the preliminary verification when the similarity degree is greater than a preset value (for example, 98%, or other values); and determining that the user does not pass the preliminary verification when the similarity degree is less than or equal to the preset value.

At block S63, when it is determined that the user to be identified has passed the preliminary verification, the executing module 102 determines a first reference point and a second reference point on the recognized human face of the user from the captured image.

In one embodiment, the determining the first reference point and the second reference point on the recognized human face of the user from the captured image includes (a1)-(a2):

(a1) Marking a Predetermined Number of Feature Points on the Recognized Human Face of the User.

In one embodiment, the predetermined number equals 68. In one embodiment, the executing module 102 can mark the 68 feature points on the recognized human face using an OpenCV (Open Source Computer Vision Library) and a Dlib function libraries.

For example, referring to FIG. 4A, the executing module 102 marks 68 feature points on a recognized human face 31.

(a2) Determining Two of the Predetermined Number of Feature Points as the First Reference Point and the Second Reference Point.

In this embodiment, a straight line connecting the first reference point and the second reference point is not perpendicular to a horizontal axis.

For example, referring to FIG. 4A and FIG. 4B, the first reference point is P1 that is corresponding to a location of the feature point 34, and the second reference point is P2 that is corresponding to a location of the feature point 45.

At block S64, when the first reference point and the second reference point are determined, the executing module 102 obtains first reference information of the first reference point and second reference information of the second reference point using the sensing device 12. The executing module 102 performs a re-verification on the user to be identified based on the first reference information of the first reference point and the second reference information of the second reference point.

In a first embodiment, the sensing device 12 includes the light emitting device 121 and the second camera 122. The sensing device 12 can capture a profile image of the side face of the user to be recognized (for example, the user 3).

In one embodiment, referring to FIG. 2, the light emitting device 121 is installed on the gate post 21 on the right side of the gate 2. The second camera 122 is installed on the gate post 21 on the left side of the gate 2. That is, when the user 3 needs to pass through the gate 2, the second camera 122 and the light emitting device 121 are respectively located on the left and right sides of the human face of the user 3. In other words, the second camera 122 is located at a position corresponding to one side of the human face of the user 3, and the light emitting device 121 is located at a position corresponding to another side of the human face of the user 3.

In this embodiment, the light emitting device 121 can emit a light beam from one side of the human face of the user to be recognized to another side of the human face of the user to be recognized. The second camera 122 can capture the profile image of the side face of the user to be recognized while the light emitting device 121 emits the light beam.

In this embodiment, a type of the second camera 122 matches a type of the light beam emitted by the light emitting device 121. For example, when the light emitting device 121 emits invisible infrared light, the second camera 122 is an infrared camera. When the light emitting device 121 emits visible light, the second camera 122 is a visible light camera.

Preferably, the light emitting device 121 emits invisible infrared light. Correspondingly, the second camera 122 is an infrared camera, such that there is no uncomfortable feeling for the user to be identified (for example, the user 3).

In this embodiment, the light emitting device 121 may be installed on the gate post 21 of the gate 2 through a first lifting structure (not shown), and the executing module 102 may adjust a distance of the light emitting device 121 relative to the lower end 213 of the gate post 21 by controlling the first lifting structure. In other words, the executing module 102 can adjust a height of the light emitting device 121.

Similarly, the second camera 122 may also be installed on the gate post 21 of the gate 2 through a second lifting structure (not shown), and the executing module 102 may adjust a distance of the second camera 122 relative to the lower end 211 of the gate post 21 by controlling the second lifting structure. In other words, the executing module 102 can adjust a height of the second camera 122.

In one embodiment, when the first reference point and the second reference point are determined, the executing module 102 controls the first lifting structure and the second lifting structure to control the sensing device 12 to move to a designated position. The designated position refers to a position where the first reference point and the second reference point can be captured.

Specifically, when the sensing device 12 is located at the designated position, the height of the second camera 122, i.e., the distance of the second camera 122 relative to the lower end 211 of the gate post 21 of the gate 2 is Hc, where $Hc=|Y0-(Y2+Y1)/2|/Y0*H0+H0$, where Y0 represents an ordinate of the top end 212 of the gate post 21, Y1 represents an ordinate of the first reference point P1, Y2 represents an ordinate of the second reference point P2, and H0 represents a distance between the lower end 211 and the top end 212 of the gate post 21.

In this embodiment, the executing module 102 may first calculate the distance of the second camera 122 relative to the lower end 211 of the gate post 21 of the gate 2 (i.e., the height Hc of the second camera 122) using the above formula, and then control the second camera 122 to move to the height Hc.

It should be noted that the ordinate Y0 of the top end 212 of the gate post 21, the ordinate Y1 of the first reference point P1, and the ordinate Y2 of the second reference point P2 mentioned above may refer to position coordinates in an image that is obtained by capturing the designated scene (such as at the gate 2) using the first camera 11. For example, the position coordinates refer to coordinates in a coordinate system XOY shown in FIG. 2 and FIG. 3. The coordinate system XOY is established by setting the top end 212 of the gate post 21 as an origin, setting a horizontal direction as the X axis, and setting a vertical direction as the Y axis.

In one embodiment, when the sensing device 12 is located at the designated position, the distance of the light emitting device 121 relative to the lower end 213 of the gate post 21 is equal to the distance of the second camera 122 relative to the lower end 211 of the gate post 21.

The executing module 102 also controls the sensing device 12 to capture the profile image of the side face of the user to be recognized when the sensing device 12 is located at the designated position. In this embodiment, the method of controlling the sensing device 12 to capture the profile image of the side face of the user to be recognized when the sensing device 12 is located at the designated position is to save energy consumption of the sensing device 12. It avoids that the sensing device 12 is always in a state of capturing the profile image of the side face of the user to be recognized.

In one embodiment, the executing module 102 may acquire the first reference information of the first reference point and the second reference information of the second reference point from the profile image of the side face of the user to be recognized. In one embodiment, the executing module 102 may also perform a second verification (i.e., re-verification) on the user to be identified based on a difference between the first reference information of the first reference point and the second reference information of the second reference point.

In one embodiment, the first reference information of the first reference point refers to a coordinate (hereinafter referred to as "first coordinate" for convenience of description) of the first reference point in the profile image of the side face. The second reference information of the second reference point refers to a coordinate (hereinafter referred to as "second coordinate" for convenience of description) of the second reference point in the profile image of the side face.

In one embodiment, the difference between the first reference information of the first reference point and the second reference information of the second reference point refers to a difference between an abscissa of the first coordinate and an abscissa of the second coordinate.

In an embodiment, when the difference between the abscissa of the first coordinate and the abscissa of the second coordinate is greater than a preset value (for example, 0.5 cm), the executing module 102 determines that the user to-be-identified (for example, the user 3) passes the second verification (i.e., re-verification). When the difference between the abscissa of the first coordinate and the abscissa of the second coordinate is less than or equal to the preset value (for example, 0.5 cm), the executing module 102 determines that the user to be identified (for example, the user 3) does not pass the second verification.

In one embodiment, the executing module 102 establishes a coordinate system in which the first coordinate and the second coordinate are located includes: setting a lower left corner of the profile image of the side face as an origin, setting a lower side edge of the profile image of the side face as the X axis, and setting a left edge of the profile image of the side face as the Y axis.

It should be noted that the establishing of the coordinate system is for illustration only. Specifically, it can be established in combination with the embodiments of the present disclosure.

In this embodiment, when the user to be identified passes the preliminary verification and the second verification (i.e., re-verification), the executing module 102 determines that the user to be identified is a real person (i.e., a person who does exist). The executing module 102 allows the user to be identified passes through the gate 2. For example, when the user to be identified passes the preliminary verification and the re-verification, the executing module 102 may control the gate 2 to open.

In a second embodiment, the sensing device 12 includes the first photoelectric sensor 123 and the second photoelectric sensor 124. In this embodiment, the sensing device 12 can sense the first reference point and the second reference point on the human face of the user to be recognized (for example, the user 3).

In one embodiment, the first photoelectric sensor 123 is used to sense the first reference point on the human face of the user to be recognized. The second photoelectric sensor 124 is used to sense the second reference point on the human face of the user to be recognized.

In this embodiment, referring to FIG. 3, a straight line connecting a location of the first photoelectric sensor 123 and a location of the second photoelectric sensor 124 is perpendicular to a horizontal plane.

In one embodiment, the first photoelectric sensor 123 may be installed on the gate post 21 of the gate 2 through a third lifting structure (not shown), and the second photoelectric sensor 124 may be installed on the gate post 21 of the gate 2 through a fourth lifting structure (not shown). The executing module 102 can adjust a distance of the first photoelectric sensor 123 relative to the lower end 211 of the gate post 21 by controlling the third lifting structure, that is, the executing module 102 can adjust a height of the first photoelectric sensor 123. The executing module 102 can adjust a distance of the second photoelectric sensor 124 relative to the lower end 211 of the gate post 21 by controlling the fourth lifting structure, that is, the executing module 102 can adjust a height of the second photoelectric sensor 124.

In one embodiment, when the first reference point and the second reference point are determined, the executing module 102 may control the sensing device 12 to move to a designated position. When the sensing device 12 is located at the designated position, the first photoelectric sensor 123 and the second photoelectric sensor 124 can sense the first reference point and the second reference point, respectively.

Specifically, when the sensing device 12 is located at the designated position, the distance of the first photoelectric sensor 123 relative to the lower end 211 of the gate post 21 (i.e., the height of the first photoelectric sensor 123) is H1, where $H1=|Y0-Y1|/Y0*H0+H0$, where Y0 represents the ordinate of the top end 212 of the gate post 21, Y1 represents the ordinate of the first reference point P1, H0 represents the distance between the lower end 211 and the top end 212 of the gate post 21. Specifically, when the sensing device 12 is located at the designated position, the distance of the second photoelectric sensor 124 relative to the lower end 211 of the gate post 21 (i.e., the height of the second photoelectric sensor 124) is H2, where $H2=|Y0-Y2|/Y0*H0+H0$, where Y0 represents the ordinate of the top end 212 of the gate post 21, and Y2 represents the ordinate of the second reference point P2, H0 represents the distance between the lower end 211 and the top end 212 of the gate post 21.

In this embodiment, the executing module 102 may first calculate the height H1 of the first photoelectric sensor 123 and the height H2 of the second photoelectric sensor 124 using the above formulas, and then the executing module 102 can control the first photoelectric sensor 123 to move to the height H1, and the second photoelectric sensor 124 to move to the height H2.

It should be noted that the ordinate Y0 of the top end 212 of the gate post 21, the ordinate Y1 of the first reference point P1, and the ordinate Y2 of the second reference point P2 mentioned above may refer to the position coordinates in an image obtained by capturing a designated scene (such as the user to be identified locates at the gate 2) using the first camera 11. For example, the position coordinates refer to the coordinates in the coordinate system XOY shown in FIG. 2 and FIG. 3. The coordinate system XOY is established by setting the top end 212 of the gate post 21 as the origin, setting the horizontal direction as the X axis, and setting the vertical direction as the Y axis.

In one embodiment, the executing module 102 can control the first photoelectric sensor 123 to sense the first reference point and control the second photoelectric sensor 124 to sense the second reference point at the same time.

In this embodiment, the first reference information of the first reference point refers to a time (for convenience of description, hereinafter referred to as "first time") when the first reference point is sensed by the first photoelectric sensor 123. The second reference information of the second reference point refers to a time (hereinafter referred to as "second time" for convenience of description) when the second reference point is sensed by the second photoelectric sensor 124.

The executing module 102 also records the first time and the second time.

In one embodiment, the executing module 102 performs the re-verification on the user to be identified according to the first time and the second time.

Specifically, when a difference between the first time and the second time is greater than a preset value (for example, 0.1 second), the executing module 102 determines that the user to be identified passes the re-verification. When the difference between the first time and the second time is less than or equal to the preset value, the executing module 102 determines that the user to be identified does not pass the re-verification.

In this embodiment, when the user to be identified passes the preliminary verification and the re-verification, the executing module 102 determines that the user to be identified is a real person (i.e., a person who does exist), the executing module 102 allows the user to be identified to pass through the gate 2 when the user to be identified is determined to be a real person. For example, when the user to be identified passes the preliminary verification and the re-verification, the executing module 102 may control the gate 2 to open.

According to the above description, the present disclosure can effectively prevent illegal persons from trying to deceive the identity recognition system 10 using legitimate users' photos, pictures, videos, plane or three-dimensional puppets, etc., thereby causing the identity recognition system 10 to misjudge.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An identity verification device comprising:
 a first camera;
 a storage device;
 at least one processor;
 the storage device storing one or more programs, which when executed by the at least one processor, cause the at least one processor to:
 control the first camera to capture an image of a user;
 perform a preliminary verification on the user based on the captured image;
 determine a first reference point and a second reference point on a human face of the user in the captured image, when the user passes the preliminary verification;

obtain first reference information of the first reference point and second reference information of the second reference point using a sensing device; and perform a re-verification on the user based on the first reference information of the first reference point and the second reference information of the second reference point;

wherein the sensing device comprises a light emitting device and a second camera; the second camera is located at a position corresponding to one side of the human face of the user, and the light emitting device is located at a position corresponding to another side of the human face of the user;

wherein the second camera captures a profile image of a side face of the user when the light emitting device emits a light beam;

wherein the at least one processor obtains the first reference information of the first reference point and the second reference information of the second reference point from the profile image of the side face of the user;

wherein the first reference information of the first reference point refers to a first coordinate of the first reference point in the profile image of the side face, and the second reference information of the second reference point refers to a second coordinate of the second reference point in the profile image of the side face;

wherein the at least one processor performs the re-verification on the user based on a difference between an abscissa of the first coordinate and an abscissa of the second coordinate;

wherein the first reference information of the first reference point refers to a first coordinate of the first reference point in the profile image of the side face, and the second reference information of the second reference point refers to a second coordinate of the second reference point in the profile image of the side face; and wherein the method further comprises:

performing the re-verification on the user based on a difference between an abscissa of the first coordinate and an abscissa of the second coordinate.

2. The identity verification device according to claim 1, wherein the determining the first reference point and the second reference point on the human face of the user in the captured image comprises:

marking a predetermined number of feature points on the human face of the user; and determining two of the predetermined number of feature points as the first reference point and the second reference point, wherein a straight line connecting the first reference point and the second reference point is not perpendicular to a horizontal axis.

3. The identity verification device according to claim 1, wherein the at least one processor is further caused to:

control the sensing device to move to a designated position when the first reference point and the second reference point are determined;

wherein when the sensing device is located at the designated position, a distance of the light emitting device relative to a lower end of one gate post of a gate is equal to a distance of the second camera relative to a lower end of another gate post of the gate;

wherein the distance of the second camera relative to the lower end of the another gate post of the gate is Hc, wherein $Hc=|Y0-(Y2+Y1)/2|/Y0*H0+H0$, wherein Y0 represents an ordinate of a top end of the another gate post, Y1 represents an ordinate of the first reference point, Y2 represents an ordinate of the second reference point, and H0 represents a distance between the lower end and the top end of the another gate post.

4. The identity verification device according to claim 1, wherein the sensing device comprises a first photoelectric sensor and a second photoelectric sensor; wherein a straight line connecting a location of the first photoelectric sensor and a location of the second photoelectric sensor is perpendicular to a horizontal plane;

wherein the first photoelectric sensor senses the first reference point, and the second photoelectric sensor senses the second reference point.

5. The identity verification device according to claim 4, wherein the first reference information of the first reference point refers to a first time when the first reference point is sensed by the first photoelectric sensor; the second reference information of the second reference point refers to a second time when the second reference point is sensed by the second photoelectric sensor;

wherein the at least one processor performs the re-verification on the user according to a difference between the first time and the second time.

6. The identity verification device according to claim 4, wherein the at least one processor is further caused to:

control the sensing device to move to a designated position when the first reference point and the second reference point are determined;

wherein when the sensing device is located at the designated position, a height of the first photoelectric sensor is H1, wherein $H1=|Y0-Y1|/Y0*H0+H0$, wherein Y0 represents an ordinate of a top end of a gate post of a gate, Y1 represents an ordinate of the first reference point, and H0 represents a distance between a lower end of the gate post and the top end of the gate post;

wherein when the sensing device is located at the designated position, a height of the second photoelectric sensor is H2, wherein $H2=|Y0-Y2|/Y0*H0+H0$, wherein Y0 represents the ordinate of the top end of the gate post, Y2 represents an ordinate of the second reference point, and H0 represents the distance between the lower end and the top end of the gate post.

7. An identity verification method, comprising:

controlling a first camera to capture an image of a user;

performing a preliminary verification on the user based on the captured image;

determining a first reference point and a second reference point on a human face of the user in the captured image, when the user passes the preliminary verification;

obtaining first reference information of the first reference point and second reference information of the second reference point using a sensing device; and performing a re-verification on the user based on the first reference information of the first reference point and the second reference information of the second reference point;

wherein the sensing device comprises a light emitting device and a second camera; the second camera is located at a position corresponding to one side of the human face of the user, and the light emitting device is located at a position corresponding to another side of the human face of the user;

wherein the method further comprises:

controlling the second camera to capture a profile image of a side face of the user when the light emitting device emits a light beam;

obtaining the first reference information of the first reference point and the second reference information of the second reference point from the profile image of the side face of the user;

wherein the first reference information of the first reference point refers to a first coordinate of the first reference point in the profile image of the side face, and the second reference information of the second reference point refers to a second coordinate of the second reference point in the profile image of the side face; and wherein the method further comprises:

performing the re-verification on the user based on a difference between an abscissa of the first coordinate and an abscissa of the second coordinate.

8. The identity verification method according to claim 7, wherein the determining the first reference point and the second reference point on the human face of the user in the captured image comprises:

marking a predetermined number of feature points on the human face of the user; and determining two of the predetermined number of feature points as the first reference point and the second reference point, wherein a straight line connecting the first reference point and the second reference point is not perpendicular to a horizontal axis.

9. The identity verification method according to claim 7, further comprising:

controlling the sensing device to move to a designated position when the first reference point and the second reference point are determined;

wherein when the sensing device is located at the designated position, a distance of the light emitting device relative to a lower end of one gate post of a gate is equal to a distance of the second camera relative to a lower end of another gate post of the gate;

wherein the distance of the second camera relative to the lower end of the another gate post of the gate is Hc, wherein $Hc=|Y0-(Y2+Y1)/2|/Y0*H0+H0$, wherein Y0 represents an ordinate of a top end of the another gate post, Y1 represents an ordinate of the first reference point, Y2 represents an ordinate of the second reference point, and H0 represents a distance between the lower end and the top end of the another gate post.

10. The identity verification method according to claim 7, wherein the sensing device comprises a first photoelectric sensor and a second photoelectric sensor; wherein a straight line connecting a location of the first photoelectric sensor and a location of the second photoelectric sensor is perpendicular to a horizontal plane;

wherein the first photoelectric sensor senses the first reference point, and the second photoelectric sensor senses the second reference point.

11. The identity verification method according to claim 10, wherein the first reference information of the first reference point refers to a first time when the first reference point is sensed by the first photoelectric sensor; the second reference information of the second reference point refers to a second time when the second reference point is sensed by the second photoelectric sensor;

wherein the method further comprises:

performing the re-verification on the user according to a difference between the first time and the second time.

12. The identity verification device according to claim 10, further comprising:

controlling the sensing device to move to a designated position when the first reference point and the second reference point are determined;

wherein when the sensing device is located at the designated position, a height of the first photoelectric sensor is H1, wherein $H1=|Y0-Y1|/Y0*H0+H0$, wherein Y0 represents an ordinate of a top end of a gate post of a gate, Y1 represents an ordinate of the first reference point, and H0 represents a distance between a lower end of the gate post and the top end of the gate post;

wherein when the sensing device is located at the designated position, a height of the second photoelectric sensor is H2, wherein $H2=|Y0-Y2|/Y0*H0+H0$, wherein Y0 represents the ordinate of the top end of the gate post, Y2 represents an ordinate of the second reference point, and H0 represents the distance between the lower end and the top end of the gate post.

* * * * *